Aug. 31, 1965  J. LORRIN  3,203,712
ANTI-BUCK-JUMP COUPLING GEARS FOR TRACTOR
AND SEMI-TRAILER VEHICLES
Filed April 1, 1963  3 Sheets-Sheet 3

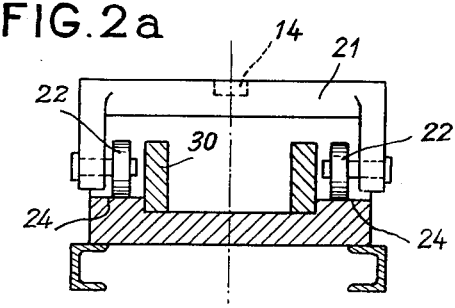
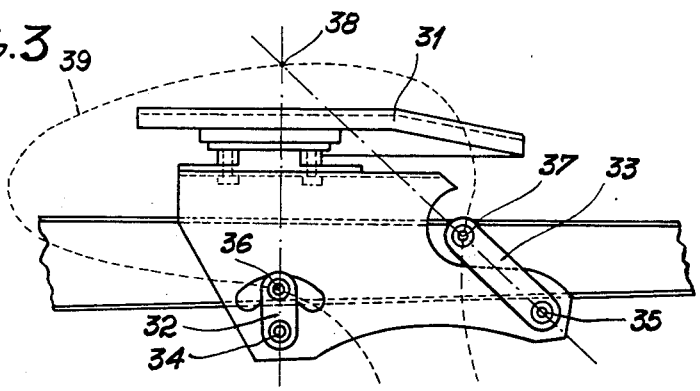

INVENTOR
Jean Lorrin

BY
Stevens, Davis, Miller & Mosher
ATTORNEYS

United States Patent Office 3,203,712
Patented Aug. 31, 1965

3,203,712
ANTI-BUCK-JUMP COUPLING GEARS FOR TRACTOR AND SEMI-TRAILER VEHICLES
Jean Lorrin, Lyon, France, assignor to Automobiles M. Berliet, Lyon, France, a French corporation
Filed Apr. 1, 1963, Ser. No. 269,334
Claims priority, application France, Apr. 5, 1962, 893,460, Patent 1,339,517
2 Claims. (Cl. 280—438)

This invention relates in general to coupling gears for tractor and semi-trailer vehicles and has specific reference to an improved device of this character.

It is well known to tractor and semi-trailer assembly operators and drivers that under certain road conditions a so-called buck-jump effect develops in these vehicles which is both detrimental to road safety and a source of discomfort for the driver.

It is the essential object of the present invention to provide a coupling gear for semi-trailer tractors, which is adapted to be mounted between the tractor frame or chassis and the platform supporting the semi-trailer, and to reduce considerably or eliminate the above-defined buck-jump effect.

Both calculus and practical experience teach that this buck-jump effect can be reduced notably:

On the one hand, by raising within certain limits the horizontal axis of vertical rotation of the tractor with respect to the semi-trailer in order to reduce the longitudinal dynamic reactions. A mathematical analysis of this phenomenon is very complicated due to the complex nature of the forces acting. However, simulation results on similar apparatus have confirmed the advantage obtained by this arrangement. In conventional platforms this axis is materialized by a horizontal pivot pin connecting the platform to the tractor chassis and having a fixed position, the advantages resulting from this arrangement appearing notably from the works of R. N. Janeway published by the Society of Automotive Engineers under the title "A Better Truck Ride for Driver and Cargo-Problems and Practical Solutions."

On the other hand, by properly shifting backwards the horizontal axis of rotation mentioned in the preceding paragraph as a function of variations occurring in the angle formed between the tractor and the semi-trailer during their relative movement of vertical rotation.

To be advantageous, the shifting of said horizontal axis of rotation should take place as follows: when the tractor is rearing or bucking with respect to the semi-trailer, this axis should be shifted forwards so that the action produced by the weight of the semi-trailer weight on the tractor be applied at a point shifted momentarily forward, since this shifting increases the semi-trailer gravity action counteracting the rearing or bucking effect on the tractor. On the other hand, if the tractor is "nose-diving" instead of rearing the aforesaid horizontal axis should be shifted backwards so that the weight of the semi-trailer applied momentarily at a point of the tractor which is shifted to the rear will counteract this forward inclination of the tractor. These shifts in weight correspond to the creation of a return moment which oppose the pitching of the tractor.

It is the primary object of this invention to provide a platform-type coupling gear for tractor and semi-trailer vehicle assemblies whereby on the one hand the momentary axis of vertical rotation of the tractor in relation to the semi-trailer can be raised and on the other hand, during a movement of vertical rotation about this axis the latter can be shifted forwards or backwards according as the front axle of the tractor is moving up- or downwards relative to the rear axle thereof.

In order to afford a clearer understanding of the present invention and of the manner in which the same may be carried out in practice, reference will now be made to the accompanying drawing, wherein:

FIGURE 2a is a cross section taken upon the line II—II of FIG. 2, and

FIGURE 3 is a diagrammatic view showing a modified form of embodiment of a coupling gear of this invention.

Figure 1:
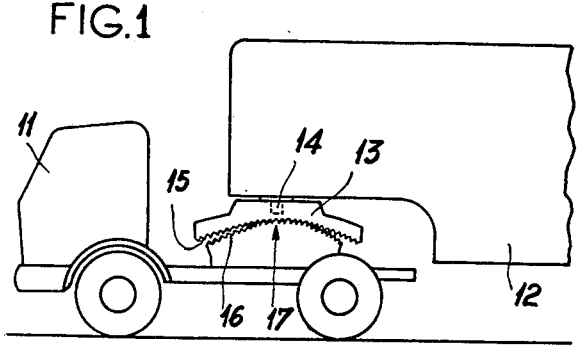
FIGURE 1 illustrates diagrammatically by way of example a tractor and semi-trailer vehicle equipped with a coupling gear shown only to facilitate the understanding of the principle of this invention.

Referring first to FIG. 1 of the drawing, the reference numeral 11 designates the tractor, 12 being the front end of the semi-trailer and 13 the platform surface on which the semi-trailer is caused to bear, the coupling being completed as usual by a king-pin 14 and conventional locking means (not shown). It is to be understood that the tractor and the semi-trailer are of the conventional type and will be discussed in greater detail later. The platform is connected to the tractor chassis as follows: A surface 15 shown only diagrammatically in the figure is provided with transverse teeth to prevent relative slipping and formed bodily with the platform; this toothed surface 15 is adapted to roll on a registering and corresponding toothed surface 16 forming an integral part of the tractor body. Were it not for the teeth, these two surfaces 15, 16 would engage each other only along a horizontal transverse straight line represented in cross-section, in FIG. 1, by the point 17. This straight line of course is the momentary axis of vertical rotation of the tractor with respect to the semi-trailer. It is clear that during this movement this axis or line moves according to the above-defined law. Since the semi-trailer bears on the tractor through this axis, it is obvious that the device shown in diagrammatic form in this figure counteracts successfully any tendency of the tractor to rear or nose-dive. However, this device has been described only with a view to afford a clearer understanding of the basic principle of the present invention, and does obviously not meet the above-mentioned requirement that the horizontal axis of the rotation should be raised to some extent with respect to the platform.

On the other hand, the devices shown in FIGS. 2 and 3 meet both requirements set forth hereinabove and constitute two basically equivalent forms of embodiment of this invention. In these two arrangements, the momentary horizontal axis of rotation is imaginary, but it is known that this fictitious axis has the same properties as the instantaneous axis of FIG. 1 as far as the action exerted by the semi-trailer on the tractor is concerned.

Figure 2:
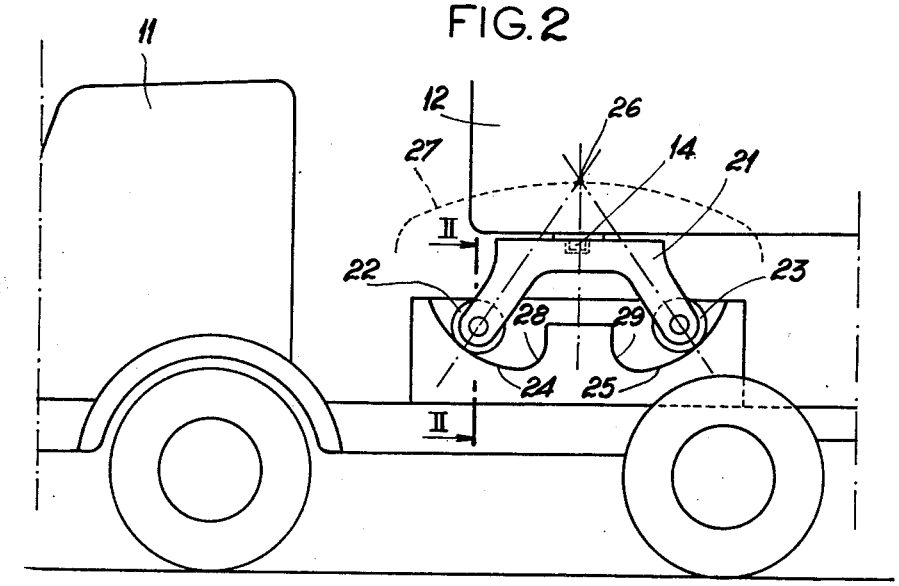
FIGURE 2 is a diagrammatic view showing a first form of embodiment of a coupling gear according to this invention.

FIGURES 2 and 2a of the drawing illustrate a typical form of embodiment of the coupling gear of this invention wherein the platform 21 is connected to the tractor through two pairs of rollers 22, 23 in rolling engagement with corresponding stationary races 24, 25 provided on the tractor. These races consist for example of adequate surfaces of grooves or rails engaged by rollers of suitable design, whereby these rollers cannot be lifted off the races 24, 25. Lateral flanges or guide members 30 may be provided to prevent any side movement or sway of the rollers 22, 23. The semi-trailer 12 is retained on the platform 21 by a device permitting the pivotal movement thereof in a horizontal plane and consisting for example of known means. As this device forms no part of the present invention it is not shown in detail in FIG. 2.

In the specific form of embodiment illustrated in FIG. 2 the momentary axis of vertical rotation lies at the intersection of the two perpendiculars drawn from the surfaces 24, 25 at the points thereof engaged by the rollers 22, 23. When the tractor and trailer assembly is inoperative, this axis lies at point 26 in the figure. The surfaces 24, 25 are determined completely from the subsequent positions which the axis 26 is to occupy as a function of the variations in the vertical angle formed between the tractor and the semi-trailer. The sequence of these positions is shown in the figure by the dotted line 27 which may be located at the most suitable height and have the best possible contour. In this connection it may be noted that the axis 26 should not be shifted unduly away from its inoperative position and should on the other hand afford a relative important angle between the tractor and the semi-trailer in case of sudden change in floor gradient as currently observed for instance at the end of loading ramps in certain constructions. To comply with this necessity the radius of curvature of surfaces 24, 25 becomes gradually very small toward the centre of the device, for example at least equal to the roller radius, and the centre of curvature of the opposite portion of each surface becomes coincident with the portion 28 or 29 of the other surface. Thus, when a set of rollers moves to 28 or 29, the platform 21 can continue its pivotal movement about the centre of these rollers which becomes thus the momentary axis of vertical rotation. Thus, from a certain angle formed between the tractor and the semi-trailer as a consequence of particular road or floor conditions, the axis 26 is shifted to the centre of the device which, at this time only, becomes inoperative.

Another typical form of embodiment of the invention which permits notably of facilitating the construction of the coupling gear is illustrated in FIG. 3. The platform is connected to the tractor chassis by means of two sets of links.

In this figure, the reference numeral 31 designates the platform on which the semi-trailer is retained as already explained hereinabove with reference to the form of embodiment shown in FIG. 2. The coupling comprises a first set of links 32 and another set of links 33, each set consisting for example of a pair of parallel links disposed symmetrically in relation to the vertical plane of symmetry of the tractor. These links are pivoted on the one hand about pivot pins 34 and 35 which are fixed in relation to the platform, and on the other hand about pins 36 and 37 which are fixed in relation to the tractor chassis. In this construction the momentary axis of vertical rotation lies at any time at the intersection of the straight lines constituting the extensions of the pair of links disposed on a same side, that is, the straight line passing through points 34 and 36 of the figure and the straight line passing through points 35 and 37. Thus, in this figure, the axis is at point 38 and this position may be the inoperative position. By properly selecting the dimensions and relative arrangement of the links, the geometrical locus of axis 38 is a curve such as shown at 39 in the figure. Besides, this curve may be selected at will, for example with a view to cause same to surround more closely the platform 31 or on the contrary to be more spaced therefrom. When the variations in the vertical angle formed between the tractor and the semi-trailer remain relatively small, as in normal open-road driving conditions, the momentary axis of vertical rotation 38 remains in the upper portion of the curve and the device produces the desired effect. If the tractor and trailer assembly is driven on a ramp or other substantial difference in gradient which during its clearance develops a relatively important reduction in the angle between the tractor and the semi-trailer, the axis 38 is shifted beyond one end—front or rear—of curve 39, so as to move along one of the descending sections of this curve and to be returned to the centre of the device which, under these conditions, will not interfere with the relatively important vertical rotation developing between the tractor and the semi-trailer.

Figure 4:
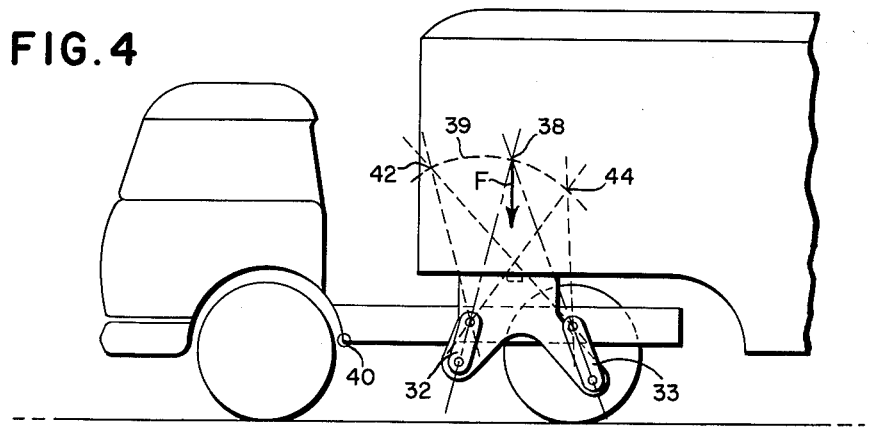
FIGS. 4–6 are diagrammatic views showing the various effects of the semi-trailer on the tractor.
Figure 5:
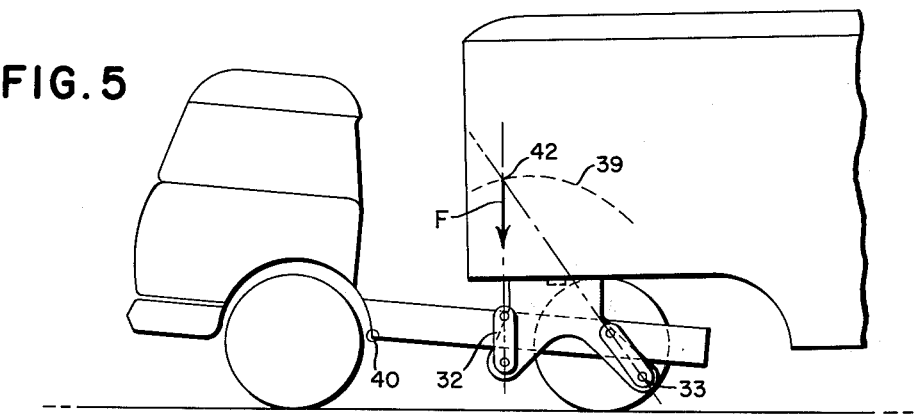
Figure 6:
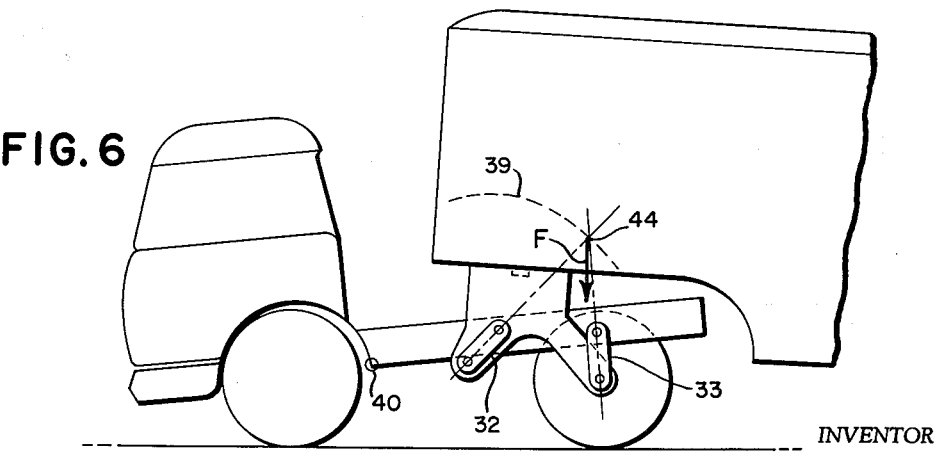

FIGS. 4–6 depict a tractor and semi-trailer of the conventional type utilizing the afore-mentioned link arrangement. The centre of gravity of the tractor is located approximately at 40 and the centre of gravity of the trailer is located at approximately the mid-point thereof. FIG. 4 shows the tractor-semi-trailer assembly in normal position, the action of the semi-trailer on the tractor being indicated by the arrow F which passes through the point of convergence 38 of the link axes. FIG. 5 shows the tractor with its front lifted, the point of application of the force F being at position 42 on curve 39. FIG. 6 shows the tractor dipping towards the front—the force F being at position 44 on curve 39. It thus can be seen that this movement of the point of application of the force operates to relieve the rear axle of the tractor in the first case (FIG. 5), and to increase the load in the second case (FIG. 6). This corresponds to the creation of a return moment which opposes the pitch of the tractor, as discussed earlier.

It would not constitute a departure from the spirit and scope of this invention to provide devices of the type illustrated in FIG. 3 but comprising a greater number of links with a view to provide, for the movement of said momentary axis of rotation, a curve deemed preferable to that resulting from the arrangement of FIG. 3. It is also possible to provide devices of the type illustrated in FIG. 2 but wherein the rollers are connected to the tractor chassis and the rails or races to the platform. Furthermore, devices utilizing both rollers and links may be devised, as well as devices incorporating any other mechanical means adapted to provide the desired final result, without departing from the basic principle of this invention.

In this connection it may be noted that the devices illustrated in FIGS. 2 and 3 of the drawing are given by way of example and should not be construed as limiting the invention, since they aim primarily at affording a clear understanding of the essential scope of the invention.

Finally, devices similar to those described and illustrated herein may be provided but which are mounted under the front end of the semi-trailer instead of on the tractor chassis. The construction of devices of this character may be easily inferred from the foregoing. The horizontal axis of rotation should describe a curve similar to the preceding ones as to its shape and position in relation to the vehicle.

It is an additional advantage of this invention to improve at any time the load distribution on each axle. In fact, when the loaded semi-trailer—which constitutes the preponderant weight of the assembly—tends, as a consequence of pitching developing therein, to exert a greater pressure on the tractor, the tractor tends to rear or buck and as already pointed out hereinabove it is known that in this case the momentary horizontal axis of vertical rotation between the tractor and the semi-trailer is shifted forwards. Since the action exerted by the semi-trailer on the tractor passes through this axis, a reduction in the overload supported by the rear axle of the tractor is observed, as contrasted with what is currently observed on a vehicle assembly not equipped with the device constituting the subject-matter of this invention. The load variation thus produced in the front axle of the tractor and in the rear and actually the sole axle of the semi-trailer is relatively smaller. Should the semi-trailer display any tendency to rear and reduce its vertical action on the tractor the effect is reversed and the distribution of the dynamic load on the axles is also improved.

I claim:

1. A device for reducing the buck-jump effect in tractors of semi-trailer vehicles comprising at least two pairs of links connecting the king-pin supporting platform of the tractor to the chassis thereof, each link of a same pair being disposed on the same lateral side of the platform with respect to the longitudinal axis of the vehicle and so directed that their longitudinal axes intersect each other at a point located above the tractor platform, thus defining a momentary axis of vertical rotation of the tractor with respect to the semi-trailer, one end of each of said links being pivoted about horizontal axes which are fixed in relation to the tractor and the other end of each of said links being pivoted about horizontal axes which are fixed in relation to said platform, so that said momentary axis of vertical rotation above said platform and shifted forward when the tractor is rearing and backward when the tractor is tilting forward.

2. A device for reducing the buck-jump effect in tractors of semi-trailer vehicles, comprising at least two pairs of rollers connecting the king-pin supporting platform of the tractor to the chassis thereof, each pair of said rollers being disposed on the same lateral side of the platform with respect to the longitudinal axis of the vehicle and so directed that a radius of each of said rollers on one side intersects at a point located above the tractor platform, at least two pairs of raceways having a predetermined vertical curvature fixedly attached to said tractor chassis, one end of each of said load-bearing means being in rolling engagement with a corresponding raceway to define a momentary axis of vertical rotation passing through said intersection of the load bearing means, said axis being above said platform and shifted forward when the tractor is rearing and backward when the tractor is tilting forward.

References Cited by the Examiner

UNITED STATES PATENTS

| | | | |
|---|---|---|---|
| 2,396,506 | 3/46 | Harris | 180—89 |
| 2,726,879 | 12/55 | Vaillant | 280—438 |
| 2,877,858 | 3/59 | Knight | 180—14 |
| 2,958,542 | 11/60 | Janeway | 280—438 |

BENJAMIN HERSH, *Primary Examiner.*

LEO FRIAGLIA, A. HARRY LEVY, *Examiners.*